(12) United States Patent
Qi et al.

(10) Patent No.: US 11,528,184 B2
(45) Date of Patent: Dec. 13, 2022

(54) PROCESSING METHOD, DEVICE AND APPARATUS FOR MESH NETWORK, AND STORAGE MEDIUM

(71) Applicant: ESPRESSIF SYSTEMS (SHANGHAI) CO., LTD., Shanghai (CN)

(72) Inventors: Yuexia Qi, Shanghai (CN); Jiangjian Jiang, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 35 days.

(21) Appl. No.: 17/153,020

(22) PCT Filed: Jun. 24, 2019

(86) PCT No.: PCT/CN2019/092475
§ 371 (c)(1),
(2) Date: Jan. 20, 2021

(87) PCT Pub. No.: WO2020/015500
PCT Pub. Date: Jan. 23, 2020

(65) Prior Publication Data
US 2021/0336843 A1 Oct. 28, 2021

(30) Foreign Application Priority Data

Jul. 20, 2018 (CN) .......................... 201810806146.3

(51) Int. Cl.
*H04L 41/0668* (2022.01)
*H04W 84/18* (2009.01)

(52) U.S. Cl.
CPC ......... *H04L 41/0668* (2013.01); *H04W 84/18* (2013.01)

(58) Field of Classification Search
None
See application file for complete search history.

(56) References Cited

U.S. PATENT DOCUMENTS

| 2010/0177703 A1* | 7/2010 | daCosta | H04W 84/22 370/328 |
| 2011/0149810 A1* | 6/2011 | Koren | H04L 12/185 370/352 |

FOREIGN PATENT DOCUMENTS

| CN | 101163158 A | 4/2008 |
| CN | 101217490 A | 7/2008 |
| CN | 102142970 A | 8/2011 |

(Continued)

*Primary Examiner* — Kenny S Lin
(74) *Attorney, Agent, or Firm* — Reinhart Boerner Van Deuren P.C.

(57) ABSTRACT

Disclosed are a processing method, device, apparatus for a mesh network, and a storage medium. The method is implemented by a node in the mesh network, including acquiring root node information of at least two root nodes in conflict if any root node conflict is detected in the mesh network; and according to the root node information of the at least two root nodes in conflict, selecting a new root node from the at least two root nodes in conflict as a root node to be used in the mesh network. In the embodiments of the present invention, according to the root node information of the two root nodes, a new root node is selected as the root node to be used in the mesh network, so as to realize direct communication between nodes in the entire wireless mesh network, and to reduce the traffic throughput of the root node.

4 Claims, 4 Drawing Sheets

(56) References Cited

FOREIGN PATENT DOCUMENTS

| | | | |
|---|---|---|---|
| CN | 104581820 | A | 4/2015 |
| CN | 105959431 | A | 6/2016 |
| CN | 108235402 | A | 6/2018 |
| CN | 108347755 | A | 7/2018 |
| CN | 108966281 | A | 12/2018 |
| JP | 2017139629 | A | 8/2017 |

* cited by examiner

FIG. 1

Acquiring root node information of at least two root nodes in conflict, if a root node conflict is detected in the mesh network — S110

Selecting a new root node from the at least two root nodes in conflict as a root node to be used in the mesh network, according to the root node information of the at least two root nodes in conflict — S120

PROCESSING METHOD, DEVICE AND APPARATUS FOR MESH NETWORK, AND STORAGE MEDIUM

TECHNICAL FIELD

The embodiments of the present invention relate to the technical field of terminal apparatus, and in particular to a processing method, device, and apparatus for a mesh network, and storage medium.

BACKGROUND ART

A wireless mesh network is referred to as wireless mesh network for short, and is also referred to as a "multi-hop" network, which is a new wireless network technology that is completely different from traditional wireless networks.

The wireless mesh network may consist of root node(s), intermediate node(s) and leaf node(s). A root node is the only sink for a wireless mesh network to communicate with the outside. The root node supports the entire wireless mesh network and forwards the data inside the wireless mesh network to the outside. An intermediate node is a node having a forwarding function throughout the wireless mesh network, which receives the data sent by the root node and forwards it to the leaf node(s), and also receives the data from the leaf node(s) and forwards it to the root node. A leaf node has no forwarding function, and can only receive the data sent by the intermediate node or send the data generated by itself to the intermediate node.

Figure 1:
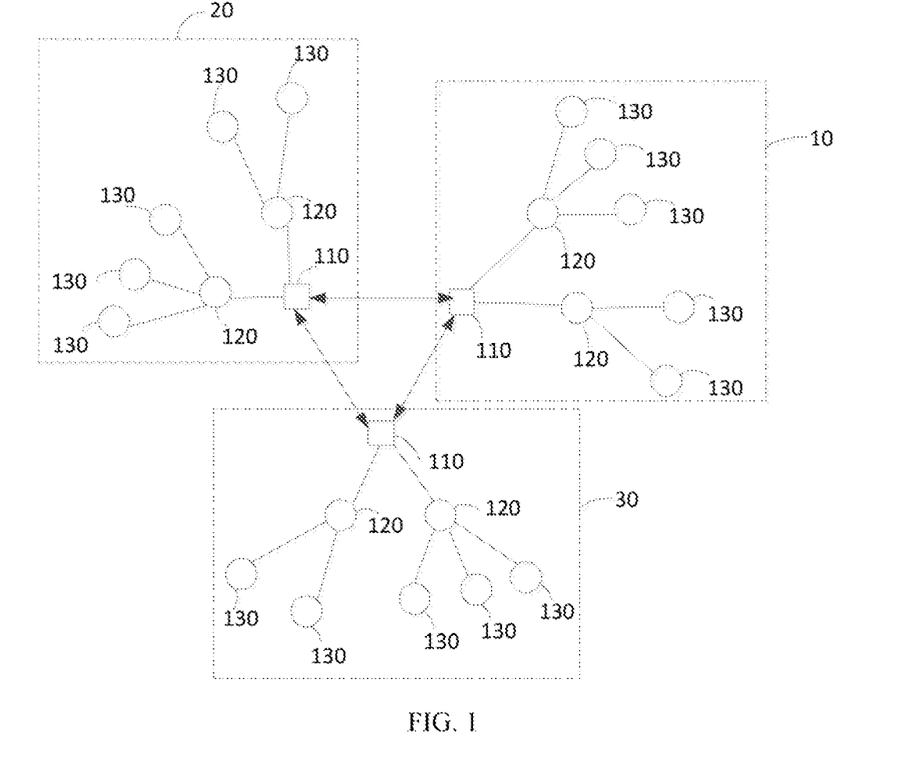
FIG. 1 is a schematic structural diagram of a wireless mesh network having multiple root node apparatuses in the prior art.

During the networking process of the wireless mesh network, as long as the apparatus is turned on and connected to a power supply, the apparatus automatically configures itself to determine the optimal transmission paths. In this way, there may be multiple root nodes present in the networking process of the wireless mesh network. FIG. 1 is a schematic structural diagram of a wireless mesh network having a plurality of root nodes in the prior art. As shown in FIG. 1, the wireless mesh network has three root nodes 110, a plurality of intermediate nodes 120 and a plurality of leaf nodes 130 to form three wireless mesh sub-networks, namely, a wireless mesh sub-network 10, a wireless mesh sub-network 20 and a wireless mesh sub-network 30. This networking mode may result in no direct communication between the intermediate nodes 120 and the leaf nodes 130 in different wireless mesh sub-networks, and communication can only be carried out by forwarding through the root node of the corresponding wireless mesh sub-network. However, this data transmission mode may increase the traffic throughput of the root node.

SUMMARY OF THE INVENTION

The invention provides a processing method, device, apparatus for a mesh network, and storage medium, so as to realize direct communication between nodes throughout the entire wireless mesh network and reduce the traffic throughput of the root node.

In a first aspect, the embodiments of the present invention provide a processing method for a mesh network, which is implemented by a root node in the mesh network, the method including:

acquiring root node information of at least two root nodes in conflict, if a root node conflict is detected in the mesh network; and selecting a new root node from the at least two root nodes in conflict as a root node to be used in the mesh network, according to the root node information of the at least two root nodes in conflict.

In a second aspect, the embodiments of the present invention further provide processing method for a mesh network, which is implemented by an intermediate node in the mesh network, the method including:

receiving root node information broadcasted by other intermediate nodes and/or root nodes;

a root node conflict is detected in the mesh network, if the root node information of the local intermediate node is different from the received root node information; and broadcasting root node conflict information to at least two root nodes in conflict, wherein the root node conflict information is used for indicating the at least two root nodes to select a new root node as a root node to be used in the mesh network.

In a third aspect, the embodiments of the present invention further provide a processing device for a mesh network, which is configured in a root node in the mesh network, the device including: an acquisition module and a selection module; wherein the acquisition module operates to acquire root node information of at least two root nodes in conflict, if a root node conflict is detected in the mesh network;

the selection module operates to select a new root node from the at least two root nodes in conflict as a root node to be used in the mesh network, according to the root node information of the at least two root nodes in conflict.

In a fourth aspect, the embodiments of the present invention further provide a processing device for a mesh network, which is configured in an intermediate node of a mesh network, the device including: a receiving module, a detection module, and a conflict information sending module; wherein:

the receiving module operates to receive root node information broadcasted by other intermediate nodes and/or root nodes;

the detection module operates to detect a root node conflict in the mesh network if the root node information of the local intermediate node is different from the received root node information; and the conflict information sending module operates to broadcast root node conflict information to at least two root nodes in conflict, wherein the root node conflict information is used for indicating the at least two root nodes to select a new root node as a root node to be used in the mesh network.

In a fifth aspect, the embodiments of the present invention further provide an apparatus, the apparatus including:

one or more processors:

a storage device for storing one or more programs, when the one or more programs are executed by the one or more processors, the one or more processors implement the processing method for a mesh network of any of the first aspect or the second aspect.

In a sixth aspect, the embodiments of the present invention also provide a computer readable storage medium having a computer program stored thereon. The program, when executed by one or more processors, implements the processing method for a mesh network of any of the first aspect or the second aspect.

The embodiments of the present invention disclose a processing method for a mesh network, which is implemented by a node in the mesh network. The method includes acquiring root node information of at least two root nodes in conflict, if any root node conflict is detected in the mesh network; and according to the root node information of the at least two root nodes in conflict, selecting a new root node from the at least two root nodes in conflict as a root node to be used in the mesh network. In the embodiments of the present invention, according to the root node information of the at least two root nodes, a new root node is selected as the root node to be used in the mesh network, so as to realize direct communication between nodes in the entire wireless mesh network, and to reduce the traffic throughput of the root node.

DETAILED DESCRIPTION OF THE PREFERRED EMBODIMENTS

The present invention will be described in further detail below with reference to the drawings and embodiments. It is to be understood that, the specific embodiments described herein are only for the purpose of explaining the present invention, and are not intended to limit the present invention. It should also be noted that for convenience of description, only part of but not all structures related to the present invention are shown in the drawings.

First Embodiment

Figure 2:
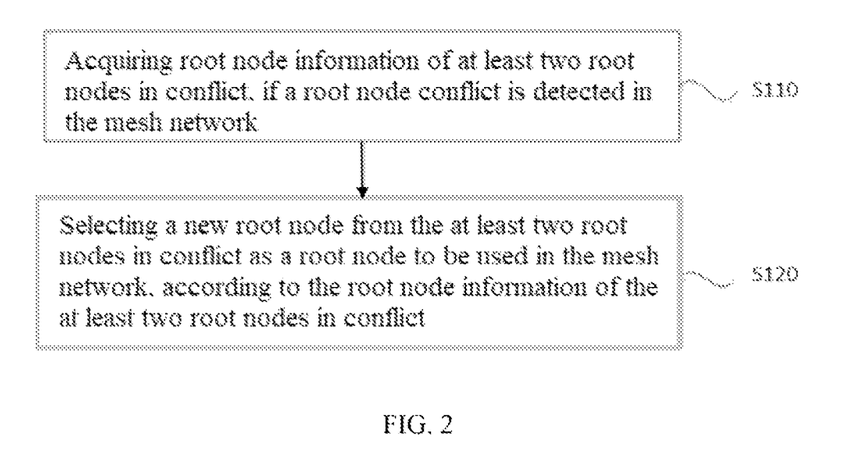
FIG. 2 is a flowchart of a processing method for a mesh network in a first embodiment of the present invention.

FIG. 2 is a flowchart of a processing method for a mesh network in a first embodiment of the present invention. This embodiment is applicable to the case of selecting a root node in a mesh network. The method may be implemented by a node in the mesh network. Further, the method may be implemented by a root node in the mesh network. The method mainly includes the following steps:

Step 110) acquiring root node information of at least two root nodes in conflict, if a root node conflict is detected in the mesh network.

In this embodiment, detecting a root node conflict in the mesh network may include: the root node conflict is detected in the mesh network, if the root node conflict broadcasted by an intermediate node is received; or the root node conflict is detected in the mesh network, if root node information received from an intermediate node and/or one or more other root nodes is different from local root node information.

After the nodes in the mesh network form a network, each node may put the root node information of the network to which it belong into a customized information element, also known as a network IE (Information Element), and broadcast the IE through a Wi-Fi beacon. Further, after a root node conflict is detected, the intermediate node places the root node conflict information in a customized information element, also known as a root node conflict IE, and broadcasts it through a Wi-Fi beacon.

In this embodiment, after receiving the Wi-Fi beacon broadcasted by the intermediate node, each root node in the mesh network detects whether the Wi-Fi beacon carries the root node conflict IE, wherein the root node conflict IE is defined by the intermediate node and broadcasted through the Wi-Fi beacon. If the beacon carries the root node conflict IE, then a root node conflict is detected in the mesh network.

In this embodiment, another way for detecting the root node conflict in the mesh network is also provided, which may include: receiving a network IE broadcasted by an intermediate node or other root nodes, detecting whether any root node information is stored in the network IE, and, if so, determining whether the root node information earned in the network IE is the same as the local root node information. If the root node information carried in the network IE is different from the local root node information, the root node conflict will be detected in the mesh network.

Step 120) selecting a new root node from the at least two root nodes in conflict as a root node to be used in the mesh network, according to the root node information of the at least two root nodes in conflict.

In this embodiment, according to the root node information of the at least two root nodes in conflict, a new root node is selected from the at least two root nodes in conflict as a root node to be used in the mesh network. When the root node conflict is detected, it indicates that there are multiple root nodes in the mesh network. According to the root node information, one root node is selected from the multiple root nodes as the root node to be used in the mesh network, while the other root nodes in the mesh network are disconnected from the external IP network and establish connections with the new root node. In this way of selecting a new root node, other root nodes in the mesh network may be deleted with only one root node left, in order to eliminate multiple mesh networks and keep all apparatuses in the same network.

The embodiments of the present invention disclose a processing method for a mesh network, which is implemented by a node in the mesh network. The method may include acquiring root node information of at least two root nodes in conflict, if any root node conflict is detected in the mesh network; and according to the root node information of the at least two root nodes in conflict, selecting a new root node from the at least two root nodes in conflict as a root node to be used in the mesh network. In the embodiments of the present invention, according to the root node information of the at least two root nodes, a new root node is selected as the root node to be used in the mesh network, so as to realize direct communication between nodes in the entire wireless mesh network, and to reduce the traffic throughput of the root node.

Second Embodiment

Figure 3:
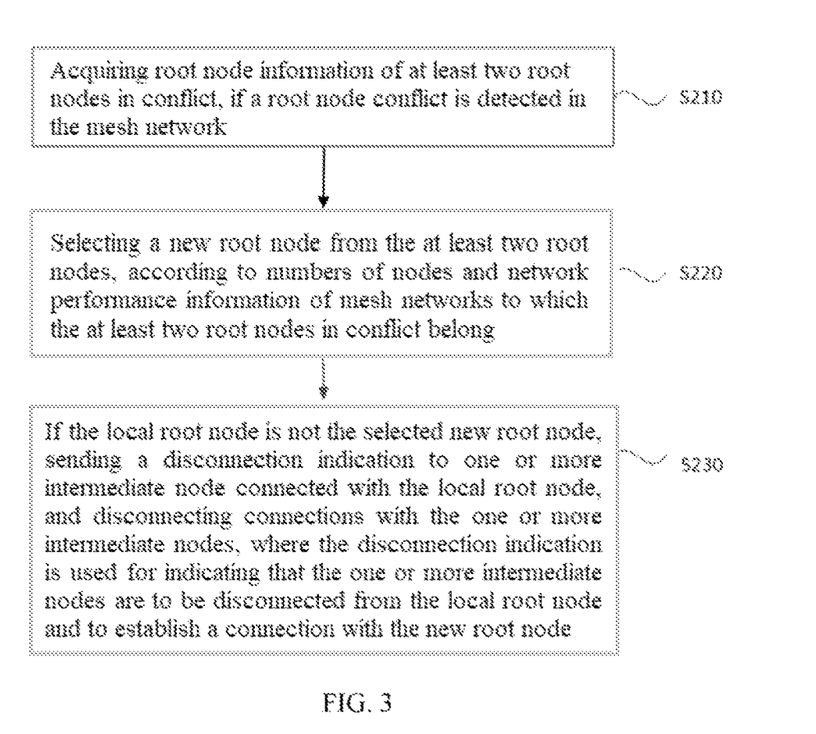
FIG. 3 is a flowchart of a processing method for a mesh network in a second embodiment of the present invention.

FIG. 3 is a flowchart of a processing method for a mesh network in a second embodiment of the present invention. This embodiment is applicable to the case of selecting a root node in a mesh network. The method may be implemented by a node in the mesh network. Further, the method may be implemented by a root node in the mesh network. This embodiment further optimizes the processing method for a mesh network. The method mainly includes the following steps:

S210) acquiring root node information of at least two root nodes in conflict, if a root node conflict is detected in the mesh network.

In this embodiment, the root node information may include at least: a root node address, the number of nodes in the mesh network to which the root node belongs, and root node network performance information.

S220) selecting a new root node from the at least two root nodes as the root node to be used in the mesh network, according to numbers of nodes and network performance information of mesh networks to which the at least two root nodes in conflict belong.

In this embodiment, a root node belonging to a mesh network having a larger number of nodes and stronger network performance information is selected from the at least two root nodes in conflict as the root node to be used in the mesh network.

In this embodiment, when the root node finds out a root node conflict, it acquires the numbers of nodes and network performance information of the mesh networks to which the at least two root nodes in conflict belong, compares the numbers of nodes and network performance information of the mesh networks to which the at least two root nodes belong, and selects the root node belonging to the mesh network having a larger number of nodes and stronger network performance information as the root node to be used in the mesh network.

This embodiment also provides another implementation, where the number of nodes in the mesh network to which a first root node belongs is larger than the number of nodes in the mesh network to which a second root node belongs. However, when the strength of the network performance information of the first root node is lower than that of the second root node, a user may set the criteria for selecting the new root node according to the working environment or working requirements of the mesh network.

When a new root node is selected as the root node to be used in the mesh network, root node abandonment information is generated, where the root node abandonment information may include at least: being not the selected new root node address. The root node abandonment information may be stored in the root node conflict IE and broadcasted through the Wi-Fi beacon.

S230) if the local root node is not the selected new root node, a disconnection indication may be seat to one or more intermediate nodes connected with the local root node, and the connection with the intermediate node is disconnected, where the disconnection indication is used for indicating that the one or more intermediate nodes are to be disconnected from the local root node and to establish a connection with the new root node.

In this embodiment, two implementations are provided for determining that the local root node is not the selected root node. In the first implementation, the local root node determines that the local root node is not the selected new root node by comparing the numbers of nodes and the network performance information of the mesh networks to which the at least two root nodes belong. In the second implementation, the local root node receives the root node conflict IE broadcasted by other root nodes. If the "being not selected as the new root node" contained in the root node abandonment information stored in the root node conflict IE shares a same address with the local root node, it is determined that the local root node is not selected as the new root node.

If the local root node is not the selected new root node, a disconnection indication may be sent to one or mote intermediate nodes connected with the local root node, and connections with the one or more intermediate nodes may be disconnected, wherein the disconnection indication is used for indicating that the one or more intermediate nodes are to be disconnected from the local root node and to establish a connection with the new root node.

Further, if the local root node is not the selected new root node, a disconnection indication is sent to one or more intermediate nodes connected with the local root node, and the connection with the intermediate node is disconnected. The local root node is also disconnected from the external IP network and establishes a connection with the new root node. At this time, the local root node becomes an intermediate node or leaf node after establishing a connection with the new root node, and thus is no longer a root node. After the connection with the new root node is established, the connection information is sent to the new root node, where the connection information may at least include the MAC addresses of the root nodes which are not selected. After receiving the connection information, the new root node generates processing information, stores the processing information in the root node conflict IE, broadcasts it through Wi-Fi beacons, and informs the nodes throughout the mesh network that a root node has been deleted. The processing information may include at least the MAC addresses of the root nodes that are not selected and have been added into the new root node network, so as to inform other apparatuses in the mesh network of the MAC addresses of the root nodes that has been deleted.

In this embodiment, if the local root node is not the selected new root node, a disconnection indication is sent to the intermediate node connected to the local root node to disconnect the connection with the intermediate node. The disconnection indication is used for indicating that the intermediate node is disconnect from the local root node and informing that the intermediate node disconnection is caused since the intermediate node establishes a connection with the new root node due to the root node conflict.

The embodiments of the present invention disclose a processing method for a mesh network, which is implemented by a node in the mesh network. The method may include acquiring root node information of at least two root nodes in conflict, if any root node conflict is detected in the mesh network; and according to the root node information of the at least two root nodes in conflict, selecting a new root node from the at least two root nodes in conflict as a root node to be used in the mesh network. In the embodiments of the present invention, according to the root node information of the at least two root nodes, a new root node is selected as the root node to be used in the mesh network, so as to realize direct communication between nodes in the entire wireless mesh network, and to reduce the traffic throughput of the root node.

Third Embodiment

Figure 4:
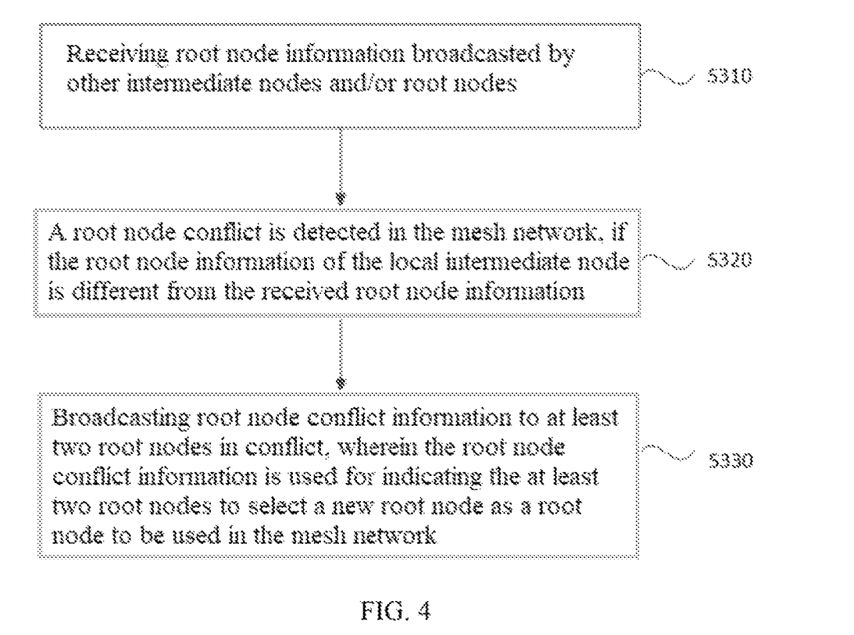
FIG. 4 is a flowchart of a processing method for a mesh network in a third embodiment of the present invention.

FIG. 4 is a flowchart of a processing method for a mesh network in a third embodiment of the present invention. This embodiment is applicable to the case of selecting a root node in a mesh network. The method may be implemented by an intermediate node in the mesh network. The method mainly includes the following steps:

In this embodiment, the processing method for a mesh network is mainly performed by the intermediate node in the mesh network.

S310) the root node information broadcasted by other intermediate nodes and/or root nodes is received.

In this embodiment, the root node information broadcasted by the intermediate node and/or the root node includes the root node information carried in the network IE broadcasted by the intermediate node and/or the root node, and also includes the root node information carried in the root node conflict IE broadcasted by the intermediate node and/or the root node.

In this embodiment, the intermediate node receives a network IE broadcasted by other intermediate nodes or root nodes to detect whether any root node information is stored in the network IE, and, if so, determines whether the root node information carried in the network IE is the same as the root node information of the local node.

In this embodiment, the intermediate node receives the root node conflict IE broadcasted by other intermediate nodes or root nodes, and determines whether the root node information carried in the root node conflict IE is the same as the root node information of the local node.

S320) a root node conflict is detected in the mesh network, if the root node information of the local intermediate node is different from the received root node information.

If the root node information can ted in the network IE is different from the local root node information, then the root node conflict is detected in the mesh network.

S330) the root node conflict information is broadcasted to at least two root nodes in conflict, where the root node conflict information is used for indicating the at least two root nodes to select a new root node as a root node to be used in the mesh network.

In this embodiment, when the intermediate node detects that there is a root node conflict in the mesh network, the root node conflict information is stored in the root node conflict IE and broadcasted through the Wi-Fi beacon.

In this embodiment, the processing method for a mesh network may also include: if a disconnection indication sent by a root node connected with the local intermediate node is received, then the connection of the root node with the local intermediate node is disconnected, and the connection with the new root node is established.

A disconnection indication sent by a root node connected with the local intermediate node is received, and the acquired reason for disconnecting the connection is due to the presence of the root node conflict, then the connection of the root node with the local intermediate node is disconnected.

In this embodiment, the connection of the root node with the local intermediate node is disconnected, and the connection with the new root node is established, of which two implementations are provided as follows. In the first implementation, the local intermediate node is disconnected from the root node, but is still connected to the leaf nodes subordinate to itself. The intermediate node searches for a new root node again and establishes a connection with the new root node. After the connection with the new root node is established, the connection information is sent to the new root node, where the connection information may at least include the MAC address of the intermediate node.

In the second implementation, after the local intermediate node implementing the processing method is disconnected from the root node, the disconnection indication is forwarded to the leaf nodes, and the leaf nodes are disconnected from the intermediate node after receiving the disconnection indication. The intermediate node and the leaf nodes search for a new root node or a new intermediate node again, and establish a connection with the new root node or the new intermediate node. After the connection is established, the connection information is sent to the new root node, wherein the connection information may at least include the MAC address of the intermediate node or the leaf node.

The embodiments of the invention provide a processing method for a mesh network, which is implemented by an intermediate node in the mesh network, including receiving root node information broadcasted by other intermediate nodes and/or root nodes. If the root node information of the local intermediate node is different from the received root node information, a root node conflict is detected in the mesh network. If a disconnection indication sent by a root node connected with the local intermediate node is received, the connection of the root node connected with the local intermediate node is disconnected, and a connection with the new root node is established. In the embodiments of the invention, the intermediate node is used for detecting whether a root node conflict exists among root nodes, if so, the root node conflict is broadcasted, and if a disconnection indication sent by the root node connected with the local intermediate node is received, the connection of the root node with the local intermediate node is disconnected, and a connection with the new root node is established, so as to realize the direct communication among nodes throughout the entire wireless mesh network, and to reduce the traffic throughput at the root node.

Fourth Embodiment

Figure 5:
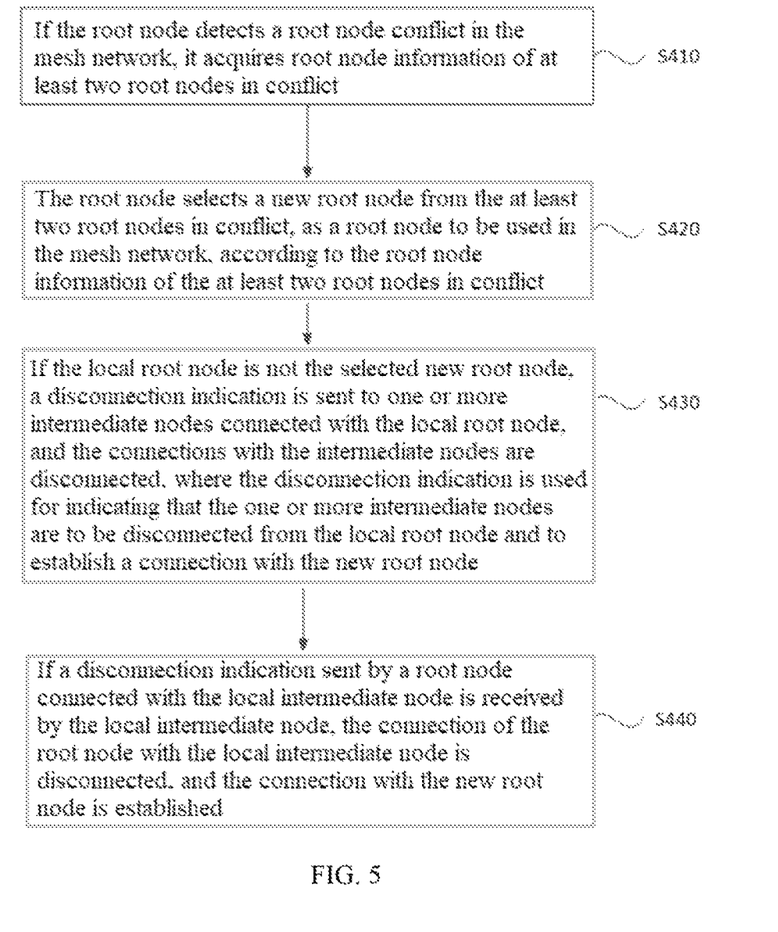
FIG. 5 is a flowchart of a processing method for a mesh network in a fourth embodiment of the present invention.

FIG. 5 is a flowchart of a processing method for a mesh network in a fourth embodiment of the present invention. This embodiment is applicable to the case of selecting a root node in a mesh network. The method may be implemented by a node in the mesh network. The method mainly includes the following steps:

S410) if the root node detects a tool node conflict in the mesh network, it acquires root node information of at least two root nodes in conflict.

In this embodiment, detecting a root node conflict in the mesh network may include: the root node conflict is detected in the mesh network, if the root node conflict broadcasted by an intermediate node is received; or the root node conflict is detected in the mesh network, if root node information received from an intermediate node and/or one or more other root nodes is different from the local root node information.

After the nodes in the mesh network form a network, each node may put the root node information of the network to which it belong into a customized information element, also known as a network IE, and broadcast the IE through a Wi-Fi beacon.

In this embodiment, another method for detecting the root node conflict in the mesh network is also provided. The intermediate node receives a network IE broadcasted by other intermediate nodes or root nodes to detect whether any root node information is stored in the network IE, and, if so, determines whether the root node information carried in the network IE is the same as the local root node information. If the root node information carried in the network IE is different from the local root node information, the root node conflict will be detected in the mesh network. When the intermediate node detects that there is a root node conflict in the mesh network, the root node conflict information is stored in the root node conflict IE and broadcasted through the Wi-Fi beacon. After receiving the beacon broadcasted by the intermediate node, each root node detects whether the beacon carries the root node conflict IE, and if the beacon carries the root node conflict IE, the root node conflict is detected in the mesh network.

In this embodiment, another method for detecting the root node conflict in the mesh network is also provided. The root node receives a network IE broadcasted by an intermediate node or other root nodes, detects whether any root node information is stored in the network IE, and, if the root node information is stored in the IE, determines whether the root node information carried in the network IE is the same as the root node information of the local machine. If the root node information carried in the network IE is different from the local root node information, the root node conflict will be detected in the mesh network.

S420) the root node selects a new root node from the at least two root nodes in conflict, as a root node to be used in the mesh network, according to the root node information of the at least two root nodes in conflict.

When the root node conflict is detected, it indicates that there are multiple root nodes in the mesh network. According to the root node information, one root node is selected from the multiple root nodes as the root node to be used in the mesh network, while the other root nodes are disconnected from the external IP network in the mesh network and establish connections with the new root node.

When the root node finds out a root node conflict, it acquires the numbers of nodes and network performance information of die mesh networks to which the at least two root nodes in conflict belong, compares the numbers of nodes and network performance information of the mesh networks to which the at least two root nodes belong, and selects the root node belonging to the mesh network having a larger number of nodes and stronger network performance information as the root node to be used in the mesh network.

S430) if the local root node is not the selected new root node, a disconnection indication is sent to one or more intermediate nodes connected with the local root node, and the connections with the intermediate nodes are disconnected, wherein the disconnection indication is used for indicating that the one or more intermediate nodes are to be disconnected from the local root node and to establish a connection with the new root node.

In this embodiment, if the local root node is not the selected new root node, a disconnection indication is sent to the intermediate nodes connected to the local root node to disconnect the connection with the intermediate node. The disconnection indication is used for indicating that the intermediate nodes are disconnect from the local root node and informing that the intermediate node disconnection is caused due to the root node conflict, and the intermediate node may establish a connection with the new root node.

Further, if the local root node is not the selected new root node, a disconnection indication is sent to one or more intermediate nodes connected with the local root node, and the connection with the intermediate node is disconnected. The local root node is also disconnected from the external IP network and establishes a connection with the new root node. At this time, the local root node becomes an intermediate node or leaf node after establishing a connection with the new root node, and thus is no longer a root node. After the connection with the new root node is established, the connection information is sent to the new root node, wherein the connection information at least includes the MAC addresses of the root nodes which are not selected. After receiving the connection information, the new root node generates processing information, stores the processing information in the root node conflict IE, broadcasts it through Wi-Fi beacons, and informs the nodes throughout the mesh network that a root node has been deleted. The processing information includes at least the MAC addresses of the root nodes that are not selected and have been added into the new root node network, so as to inform other apparatuses in the mesh network of the MAC address of the root node that has been deleted.

S440) if a disconnection indication sent by a root node connected with the local intermediate node is received, the connection of the root node with the local intermediate node is disconnected, and the connection with the new root node is established.

If a disconnection indication sent by a root node connected with the local intermediate node is received, and the acquired reason for disconnecting the connection is due to the presence of the root node conflict, then the connection of the root node with the local intermediate node is disconnected.

In this embodiment, the connection of the root node with the local intermediate node is disconnected, and the connection with the new root node is established, of which two implementations are provided as follows. In the first implementation, the local intermediate node is disconnected from the root node, but is still connected to the leaf nodes subordinate to itself. The intermediate node searches for a new root node again and establishes a connection with the new root node. After the connection with the new root node is established, the connection information is sent to the new root node, wherein the connection information may at least include the MAC address of the intermediate node.

In the second implementation, after the local intermediate node is disconnected from the root node, the disconnection indication is forwarded to the leaf nodes, and the leaf nodes are disconnected from the intermediate node after receiving the disconnection indication. The intermediate node and the leaf nodes search for a new root node or a new intermediate node again, and establish a connection with the new root node or the new intermediate node. After the connection is established, the connection information is sent to the new root node, where the connection information at least includes the MAC address of the intermediate node or the leaf node.

The embodiments of the present invention disclose a processing method for a mesh network, which is implemented by a node in the mesh network. The method may include acquiring root node information of at least two root nodes in conflict, if any root node conflict is detected in the mesh network; and according to the root node information of the at least two root nodes in conflict, selecting a new root node from the at least two root nodes in conflict as a root node to be used in the mesh network. In the embodiments of the present invention, according to the root node information of the at least two root nodes, a new root node is selected as the root node to be used in the mesh network, so as to realize direct communication between nodes throughout the wireless mesh network, and to reduce the traffic throughput of the root node.

Fifth Embodiment

Figure 6:
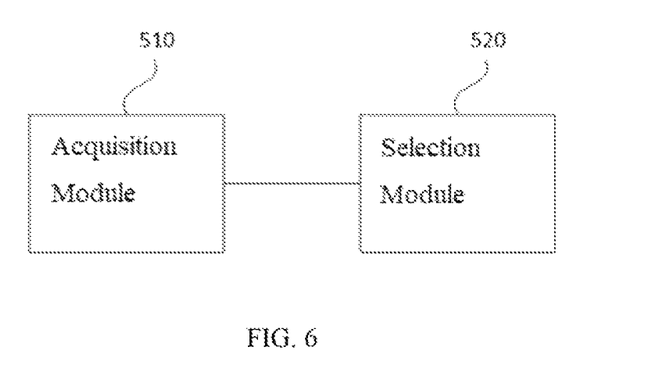
FIG. 6 is a schematic structural diagram of a processing device for a mesh network in a fifth embodiment of the present invention.

FIG. 6 is a schematic structural diagram of a processing device for a mesh network in a fifth embodiment of the present invention. This embodiment is applicable to the case of selecting a root node in a mesh network. The device is configured in a node of the mesh network. Further, the device may be configured in a root node of the mesh network. The device mainly includes:

an acquisition module 510 for acquiring root node information of at least two root nodes in conflict, if a root node conflict is detected in the mesh network; and a selection module 520 for selecting a new root node from the at least two root nodes in conflict as the root node to be used in the mesh network, according to the root node information of the at least two root nodes in conflict.

Particularly, the acquisition module 510 may specifically operate such that the root node conflict is detected in the mesh network, if the root node conflict broadcasted by an intermediate node is received; or the root node conflict is detected in the mesh network, if root node information received from an intermediate node and/or one or more other root nodes is different from the local root node information.

Particularly, the selection module 520 may specifically operate to select a new root node from the at least two root nodes as the root node to be used in the mesh network, according to numbers of nodes and network performance information of mesh networks to which the at least two root nodes in conflict belong.

Further, the selection module 520 may specifically operate to select from the at least two root nodes in conflict, a root node belonging to a mesh network having a larger number of nodes and stronger network performance information, as the root node to be used in the mesh network.

Further, this device may include: an indication sending module and a disconnection module, where:

the indication sending module operates to send a disconnection indication to one or more intermediate nodes connected with a local root node, if the local root node is not the selected new root node; and the disconnection module operates to disconnect connections with the one or more intermediate nodes, wherein the disconnection indication is used for indicating that the one or more intermediate nodes are to be disconnected from the local root node and to establish a connection with the new root node.

The embodiments of the present invention disclose a processing device for a mesh network, which is implemented by acquiring root node information of at least two root nodes in conflict, if any root node conflict is detected in the mesh network; and according to the root node information of the at least two root nodes in conflict, selecting a new root node from the at least two root nodes in conflict as a root node to be used in the mesh network. In the embodiments of the present invention, according to the root node information of the at least two root nodes, a new root node is selected as the root node to be used in the mesh network, so as to realize direct communication between nodes throughout the wireless mesh network, and to reduce the traffic throughput of the root node.

Sixth Embodiment

Figure 7:
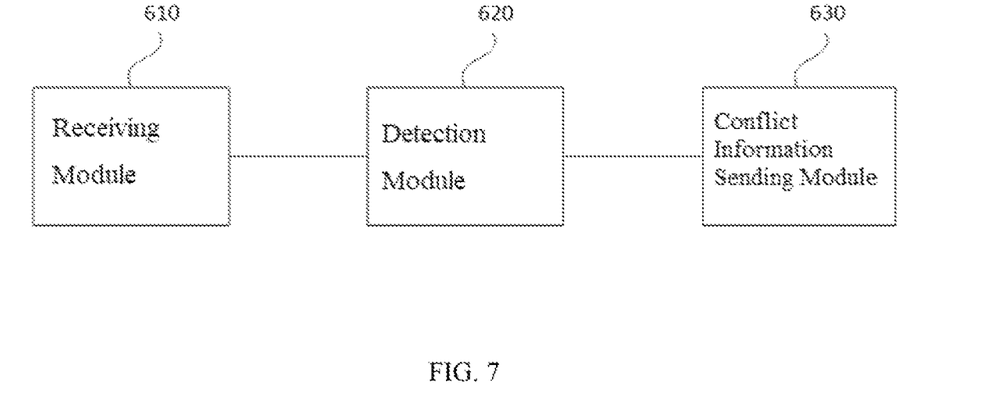
FIG. 7 is a schematic structural diagram of a processing device for a mesh network in a sixth embodiment of the present invention.

FIG. 7 is a schematic structural diagram of a processing device for a mesh network in a sixth embodiment of the present invention. This embodiment is applicable to the case of selecting a root node in a mesh network. The device is configured in a node of the mesh network. Further, the device may be configured in an intermediate node of the mesh network. The device mainly includes:

a receiving module 610 for receiving root node information broadcasted by other intermediate nodes and/or root nodes.

In this embodiment, the intermediate node receives a network IE broadcasted by other intermediate nodes or root nodes to detect whether any root node information is stored in the network IE, and, if so, determines whether the root node information carried in the network IE is the same as the local root node information.

If the root node information carried in the network IE is different from the local root node information, the root node conflict will be detected in the mesh network.

The detection module 620 operates to detect a root node conflict in the mesh network if the root node information of the local intermediate node is different from the received root node information.

In this embodiment, when the intermediate node detects that there is a root node conflict in the mesh network, the root node conflict information is stored in the root node conflict IE and broadcasted through the Wi-Fi beacon.

The conflict information sending module 630 operates to broadcast root node conflict information to at least two root nodes in conflict, wherein the root node conflict information is used for indicating the at least two root nodes to select a new root node as a root node to be used in the mesh network.

This device also includes: a disconnection module and a connection module, where:

the disconnection module operates to, if a disconnection indication sent by a root node connected with the local intermediate node is received, disconnect a connection with the root node of the local intermediate node; and the connection module operates to establish a connection with the new root node.

The embodiments of the invention provides a processing device for a mesh network, which is implemented by receiving root node information broadcasted by other intermediate nodes and/or root nodes; and if the root node information of the local intermediate node is different from the received root node information, a root node conflict is detected in the mesh network. If a disconnection indication sent by a root node connected with the local intermediate node is received, the connection of the root node connected with the local intermediate node is disconnected, and a connection with the new root node is established. In the embodiments of the invention, the intermediate node is used for detecting whether a root node conflict exists among root nodes, if so, the root node conflict is broadcasted, and if a disconnection indication sent by the root node connected with the local intermediate node is received, the connection of the root node with the local intermediate node is disconnected, and a connection with the new root node is established, so as to realize the direct communication among nodes throughout the entire wireless mesh network, and to reduce the traffic throughput at the root node.

Seventh Embodiment

Figure 8:
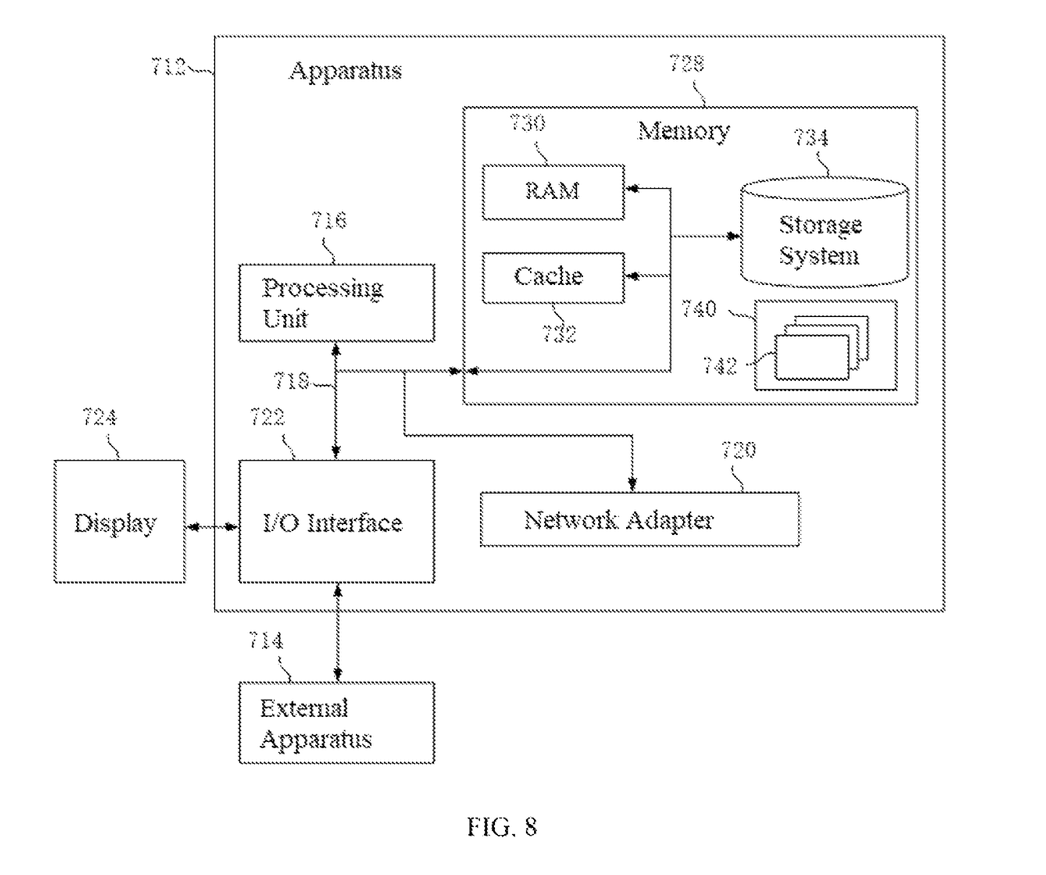
FIG. 8 is a schematic structural diagram of an apparatus in a seventh embodiment of the present invention.

FIG. 8 is a schematic structural diagram of an apparatus in a seventh embodiment of the present invention. FIG. 8 shows a block diagram of an exemplary general-purpose apparatus 712 suitable for implementing embodiments of the present invention. The general-purpose apparatus 712 shown in FIG. 8 is only an example and should not considered as imposing any limitation on the functions and usage scope of embodiments of the present invention.

As shown in FIG. 8, the apparatus 712 is represented in the form of a general-purpose computing apparatus. Components of the apparatus 712 may include, but not limited to, one or more processors or processing units 716, a system memory 728, and a bus 718 connecting different system components, including the system memory 728 and the processing unit 716.

The bus 718 represents one or more of several types of bus structures, including a memory bus or memory controller, a peripheral bus, a graphics acceleration port, a processor, or a local bus using any of a variety of bus structures. For example, these architectures may include, but not limited to. Industrial Standard Architecture (ISA) bus, Micro Channel Architecture (MAC) bus, Enhanced ISA bus, Video Electronics Standard Association (VESA) local bus, and Peripheral Component Interconnect (PCI) bus.

The apparatus 712 typically includes a variety of computer system readable media. These media may be any available media accessible by the apparatus 712, including volatile and nonvolatile media, removable and non-removable media.

The system memory 728 may include computer system readable media in the form of a volatile memory, such as a random-access memory (RAM) 730 and/or a cache memory 732. The apparatus 712 may further include other removable/non-removable, volatile/non-volatile computer system storage media. As example only, a storage system 734 may be used to read from and write to non-removable, nonvolatile magnetic media (not shown in FIG. 8, commonly referred to as a "hard disk drive"). Although not shown in FIG. 8, a magnetic disk drive for reading from or writing to a removable non-volatile magnetic disk (e.g., "floppy disk") and an optical disk drive for reading from or writing to a removable non-volatile optical disk (e.g., CD-ROM, DVD-ROM, or other optical media) may be provided. In these cases, each drive may be connected to the bus 718 through one or more data media interfaces. The memory 728 may include at least one program product having a set (e.g., at least one) of program modules configured to perform the functions of various embodiments of the present invention.

The program/utility tool 740 having a set (at least one) of program modules 742 may be stored in, for example, the memory 728, such program modules 742 including, but not limited to, an operating system, one or more application programs, other program modules, and program data, each or a combination of some ones of these embodiments may include an implementation of a network environment The program module 742 generally performs functions and/or methods in Tie described embodiments of the present invention.

The apparatus 712 may also communicate with one or more external apparatuses 714 (e.g., a keyboard, pointing device, display 724, etc.), as well as communicating with one or more apparatuses that enable a user to interact with the apparatus 712 and/or communicating with any device (e.g., a network card, a modem, etc.) that enables the apparatus 712 to communicate with one or more other computing apparatuses. Such communication may be performed through an input/output (I/O) interface 722. Also, the apparatus 712 may also communicate with one or more networks (e.g., a local area network (LAN), a wide area network (WAN), and/or a public network, e.g., the Internet) through a network adapter 720. As shown in FIG. 8, the network adapter 720 communicates with other modules of the apparatus 712 via the bus 718. It should be understood that although not shown in FIG. 8, other hardware and or software modules may be used in conjunction with the apparatus 712, including but not limited to a microcode, a device driver, a redundant processing unit, an external disk drive array, a RAID system, a tape drive, a data backup storage system, and the like.

The processing unit 716 executes various functional applications and data processing by running programs stored in the system memory 728, for example, implementing the processing method for a mesh network as provided by the embodiment of the present invention, the method including:

acquiring root node information of at least two root nodes in conflict, if a root node conflict is detected in the mesh network; and selecting a new root node from the at least two root nodes in conflict as a root node to be used in the mesh network, according to the root node information of the at least two root nodes in conflict.

The embodiments of the invention also provide another apparatus, which includes one or more processors; and a storage device for storing one or more programs; where when the one or more programs are executed by the one or more processors, the one or more processors implement the processing method for a mesh network as provided by the embodiments of the present invention, the method including:

receiving root node information broadcasted by other intermediate nodes and/or root nodes;

a root node conflict is detected in the mesh network, if the root node information of the local intermediate node is different from the received root node information; and sending the root node conflict information to at least two root nodes in conflict, wherein the root node conflict information is used for indicating the at least two root nodes to select a new root node as a root node to be used in the mesh network.

Of course, those skilled in the art shall understand that the processor can also implement the technical solution of processing method for a mesh network as provided by any embodiment of the present invention. The hardware structure and functions of the terminal may be referred in the seventh embodiment.

Eighth Embodiment

An eighth embodiment of the present invention also provides a computer readable storage medium on which a computer program is stored, where the program, when executed by one or mere processors, implements the processing method for a mesh network as provided by all embodiments of the present invention. The method includes:

acquiring root node information of at least two root nodes in conflict, if a root node conflict is detected in the mesh network; and the root node selecting a new root node from the at least two root nodes in conflict as a root node to be used in the mesh network, according to the root node information of the at least two root nodes in conflict.

The computer storage medium of the embodiment of the present invention may adopt any combination of one or more computer readable media. The computer readable medium may be a computer readable signal medium or a computer readable storage medium. The computer readable storage medium may be, for example, but not limited to, an electrical, magnetic, optical, electromagnetic, infrared, or semiconductor system, apparatus, or device, or any combination thereof. More specific embodiments (as a non-exhaustive list) of the computer readable storage medium may include: an electrical connection having one or more wires, a portable computer disk, a hard disk, a random access memory (RAM), a read only memory (ROM), an erasable programmable read only memory (EPROM or flash memory), an optical fiber, a portable compact disk-read only memory (CD-ROM), an optical storage device, a magnetic storage device, or any suitable combination thereof. In this document, the computer readable storage medium may be any tangible medium containing or storing a program that may be used by or in combination with an instruction execution system, apparatus, or device.

The computer readable signal medium may include a data signal propagated in a baseband or as part of a carrier wave, in which a computer readable program code is carried. This propagated data signal may take many forms, including but not limited to electromagnetic signals, optical signals, or any suitable combination thereof. The computer-readable signal medium may also be any computer-readable medium other than the computer-readable storage medium, which may transmit, propagate, or transport a program for use by or in combination with the instruction execution system, apparatus, or device.

The program code contained on the computer readable medium may be transmitted using any suitable medium including, but not limited to, Wi-Fi, wire, optical cable, RF, etc., or any suitable combination thereof.

Computer program code for performing the operations of the present invention may be written in one or more programming languages or combinations thereof. The programming languages may include object-oriented programming languages such as Java, Smalltalk, C++, and conventional procedural programming languages such as "C" language or similar programming languages. The program code may be executed on a subscriber computer entirely or partially, executed as a separate software package, executed partially on the subscriber computer and partially on a remote computer, or completely executed on a remote computer or a server. In the case involving a remote computer, the remote computer may be connected to the subscriber computer through any type of networks, including a local area network (LAN) or a wide area network (WAN), or may be connected to an external computer (e.g., connected via the Internet using an Internet service provider).

Embodiments of the present invention also provide another computer readable storage medium on which a computer program is stored, where the program, when executed by one or mere processors, implements the processing method for a mesh network as provided by all embodiments of the present invention. The method includes:

receiving root node information broadcasted by other intermediate nodes and/or root nodes;

a root node conflict is detected in the mesh network, if the root node information of the local intermediate node is different from the received root node information; and sending the root node conflict information to at least two root nodes in conflict, where the root node conflict information is used for indicating the at least two root nodes to select a new root node as a root node to be used in the mesh network.

Of course, a storage medium including computer-executable instructions that are not limited to the method operations described above, as provided by an embodiment of the present invention, may also perform related operations in the processing method for a mesh network as provided by any embodiment of the present invention. For the introduction of the storage media, please refer to the explanation in the eighth embodiment.

Note that the above described disclosure is only the preferred embodiment of the present invention and the applied technical principles. Those skilled in the art will understand that the present invention is not limited to the specific embodiments described herein, and those skilled in the art may make various obvious modifications, re-adjustments and substitutions without departing from the claimed scope of the present invention. Therefore, although the present invention has been described in more detail by the above mentioned embodiments, the present invention is not limited to the above mentioned embodiments, but may include more other equivalent embodiments without departing from the concept of the present invention, and the scope of the present invention shall be determined by the scope of the appended claims.

The invention claimed is:

1. A processing method for a mesh network, implemented by an intermediate node in the mesh network, the method comprising:

receiving root node information broadcasted by other intermediate nodes and/or root nodes;

a root node conflict is detected in the mesh network, if the root node information of the local intermediate node is different from the received root node information; and broadcasting root node conflict information to at least two root nodes in conflict, wherein the root node conflict information is used for indicating the at least two root nodes to select a new root node as a root node to be used in the mesh network.

2. The processing method for a mesh network according to claim 1, wherein the method further comprises:

if a disconnection indication sent by a root node connected with the local intermediate node is received, disconnecting the connection of the root node with the local intermediate node, and establishing a connection with the new root node.

3. An apparatus, configured in an intermediate node of the mesh network, comprising:

one or more processors;

a storage device for storing one or more programs, when the one or more programs are executed by the one or more processors, the one or more processors are caused to perform the operations comprising:

receiving root node information broadcasted by other intermediate nodes and/or root nodes;

a root node conflict is detected in the mesh network, if the root node information of the local intermediate node is different from the received root node information; and broadcasting root node conflict information to at least two root nodes in conflict, wherein the root node conflict information is used for indicating the at least two root nodes to select a new root node as a root node to be used in the mesh network.

4. The apparatus according to claim 3, wherein the operations further comprise:

if a disconnection indication sent by a root node connected with the local intermediate node is received, disconnecting the connection of the root node with the local intermediate node, and establishing a connection with the new root node.

\* \* \* \* \*